(12) United States Patent
Yui

(10) Patent No.: US 7,152,578 B2
(45) Date of Patent: Dec. 26, 2006

(54) VALVE CHARACTERISTIC CONTROLLING APPARATUS AND METHOD FOR INTERNAL COMBUSTION ENGINE

(75) Inventor: Takasi Yui, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/256,170

(22) Filed: Oct. 24, 2005

(65) Prior Publication Data

US 2006/0090730 A1    May 4, 2006

(30) Foreign Application Priority Data

Oct. 29, 2004    (JP)    ............... 2004-317203

(51) Int. Cl.
F02D 13/02    (2006.01)
F01L 1/34    (2006.01)

(52) U.S. Cl. ................. 123/348; 123/90.15; 123/90.17

(58) Field of Classification Search .. 123/90.15–90.18, 123/90.11, 346, 348
See application file for complete search history.

(56) References Cited

U.S. PATENT DOCUMENTS 6,397,800 B1 *    6/2002    Nohara et al. ........... 123/90.15
6,615,775 B1 *    9/2003    Takemura et al. ....... 123/90.15

FOREIGN PATENT DOCUMENTS

JP    A 2001-263015    9/2001

* cited by examiner

*Primary Examiner*—T. M. Argenbright
(74) *Attorney, Agent, or Firm*—Oliff & Berridge, PLC

(57) ABSTRACT

An electronic controller variably controls the center of an operating angle of an intake valve as follows: when an engine load factor is equal to or higher than a threshold in a low load operation, the electronic controller advances the center of the operating angle with a decrease in the engine load factor. When the engine load factor is lower than the threshold in the low load operation, the electronic controller retards the center of the operating angle with a decrease in the engine load factor.

4 Claims, 6 Drawing Sheets

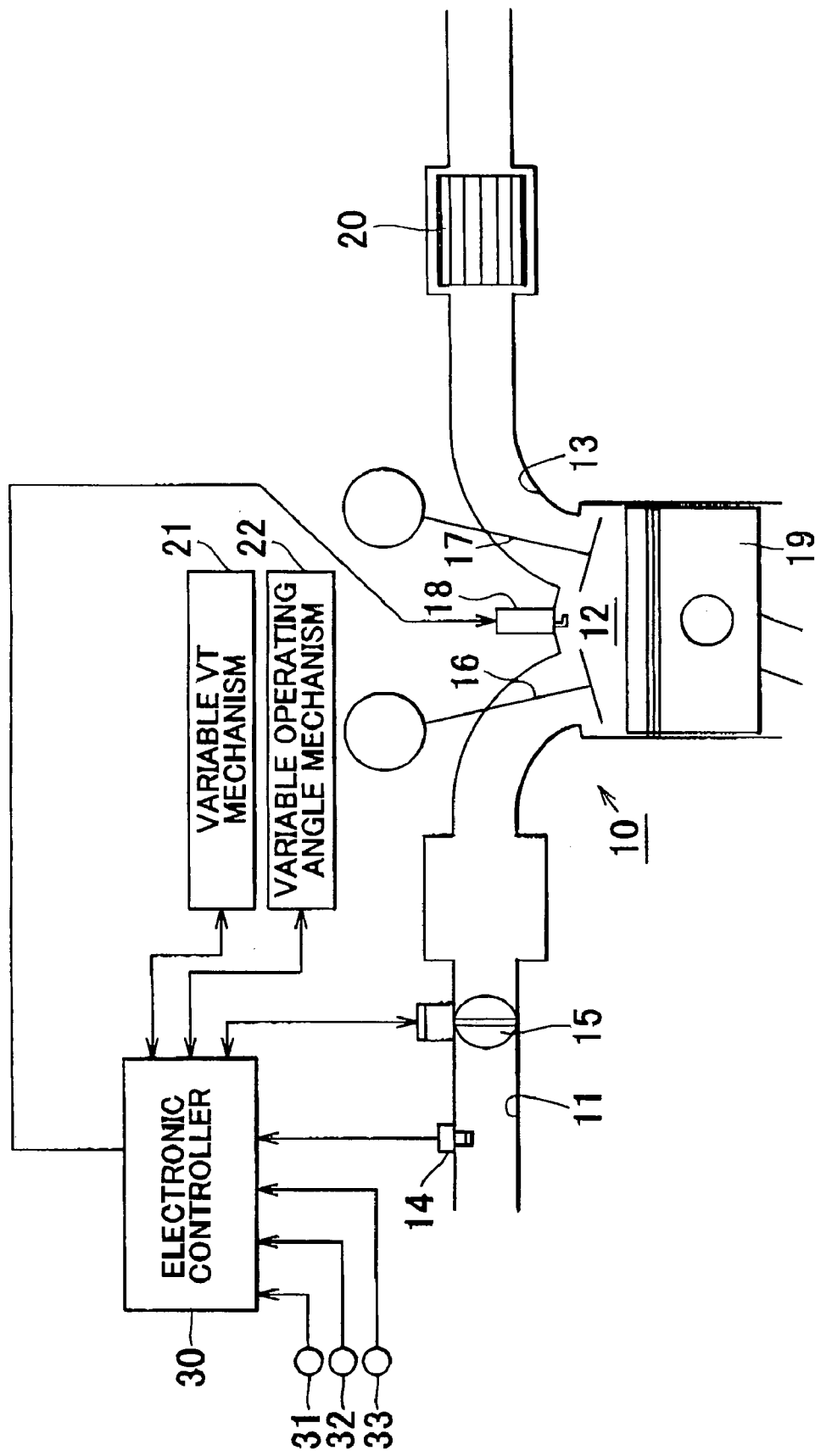

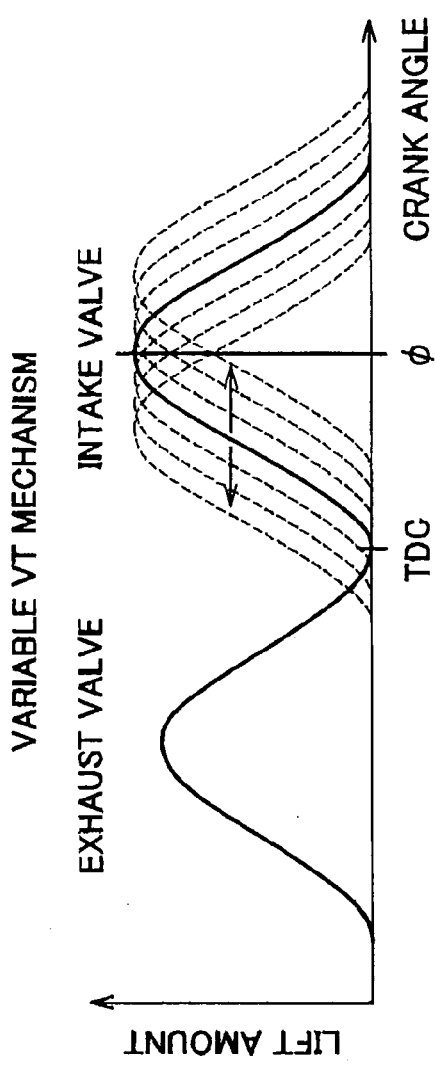
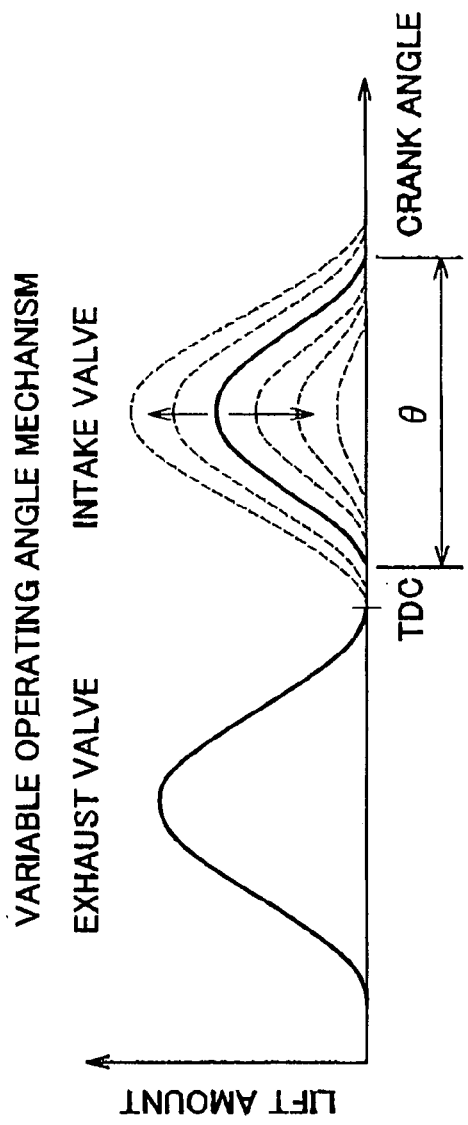

EXAMPLE OF MOST ADVANCED CENTER OF OPERATING ANGLE $\phi$

EXAMPLE OF MOST RETARDED CENTER OF OPERATING ANGLE $\phi$

VALVE CHARACTERISTIC CONTROLLING APPARATUS AND METHOD FOR INTERNAL COMBUSTION ENGINE

INCORPORATION BY REFERENCE

The disclosure of Japanese Patent Application No. 2004-317203 filed on Oct. 29, 2005 including the specification, drawings and abstract is incorporated herein by reference in its entirety.

BACKGROUND OF THE INVENTION

1. Field of the Invention

The invention generally relates to a valve characteristic controller that is used for an internal combustion engine having a variable valve timing mechanism and a variable valve operating angle mechanism. More particularly, the invention relates to improvement in a control for improving fuel efficiency in a low load operation.

2. Description of the Related Art

Variable valve characteristic mechanisms for changing characteristics of engine valves (intake and exhaust valves) have been practically used in internal combustion engines such as on-board internal combustion engines (e.g., Japanese Laid-Open Patent Publication No. JP 2001-263015 A). Examples of the variable valve characteristic mechanisms are a variable valve timing mechanism and a variable operating angle mechanism. The variable valve timing mechanism changes valve timing of engine valves. The variable operating angle mechanism changes an operating angle of engine valves, that is, a crank angle between opening and closing of the engine valves.

Internal combustion engines using both the variable valve timing mechanism and the variable operating angle mechanism for the intake valve have also been practically used. In such internal combustion engines, the valve timing and the operating angle of the intake valve can be independently adjusted according to the operating state of the internal combustion engine. Therefore, valve characteristics can be controlled in a more detailed manner. As a result, fuel consumption capability and exhaust capability of the internal combustion engines can be significantly improved.

SUMMARY OF THE INVENTION

The inventors carefully studied the relation between setting of valve characteristics (valve timing and operating angle) of an intake valve and fuel consumption capability of an internal combustion engine. The study confirmed that further improvement in fuel combustion capability was possible in an idle state and in an extremely low load range that was lower in load than the idle state.

It is an object of the invention to provide valve characteristic controlling apparatus and method for an internal combustion engine which enables further improvement in fuel combustion capability of an internal combustion engine in a low load operation.

A first aspect of the invention relates to a valve characteristic controlling apparatus for an internal combustion engine. The valve characteristic controlling apparatus includes a valve characteristic device that variably controls an operating angle of an intake valve and a center of the operating angle according to an operating state of the internal combustion engine; and a controller that controls the valve characteristic device so as to reduce the operating angle of the intake valve to reduce an intake air amount in a low load operation of the internal combustion engine, to advance the center of the operating angle of the intake valve with a decrease in the engine load when an engine load is equal to or higher than a predetermined value in the low load operation, and to retard the center of the operating angle of the intake valve with a decrease in the engine load when the engine load is lower than the predetermined value in the low load operation.

When the operating angle of the intake valve is reduced and the opening timing of the intake valve (the timing the intake valve switches from the closed state to the open state) is retarded, an intake resistance (a resistance of the intake air that is introduced from an intake manifold to a combustion chamber) increases, causing an increase in pumping loss. In order to suppress the increase in pumping loss, the opening timing of the intake valve is advanced by advancing the center of the operating angle of the intake valve. By suppressing the increase in pumping loss, reduction in fuel efficiency (specific fuel consumption) can be suppressed.

In a low load operation, insufficient fuel atomization is likely to occur due to a small intake air amount. Especially in a situation where the engine load is low, that is, in a situation where the intake air amount is extremely small (in a situation where the engine load is lower than the predetermined value), such insufficient fuel atomization becomes serious. In this case, even if the increase in pumping loss is suppressed by advancing the center of the operating angle of the intake valve, the combustion state is degraded due to the seriously insufficient fuel atomization. As a result, fuel efficiency is reduced.

In view of the above problem, according to the invention, when the engine load is equal to or higher than a predetermined value in the low load operation, the center of the operating angle of the intake valve is advanced with a decrease in the engine load. On the other hand, when the engine load is lower than the predetermined value in the low load operation, the center of the operating angle of the intake valve is retarded with a decrease in the engine load.

As described above, when the engine load is relatively high (equal to or higher than the predetermined value) in the low load operation, the center of the operating angle of the intake valve is advanced with a decrease in the engine load. In such a relatively high engine load situation, insufficient fuel atomization is relatively less likely to occur due to a large intake air amount. Therefore, advancing the center of the operating angle suppresses increase in pumping loss and thus suppresses reduction in fuel efficiency. The more the center of the operating angle is advanced and the larger the intake air amount is (that is, the higher the engine load is), the more the increase in pumping loss is suppressed and the more the fuel efficiency is improved as a result.

According to the first aspect of the invention, when the engine load is equal to or higher than the predetermined value in the low load operation, the center of the operating angle of the intake valve is advanced with a decrease in the engine load. Although fuel efficiency generally tends to decrease with a decrease in the engine load, such a tendency can be alleviated by setting the center of the operating angle as such. As a result, further improvement in fuel consumption capability can be obtained.

On the other hand, when the engine load is relatively low (lower than the predetermined value) in the low load operation, the center of the operating angle of the intake valve is retarded with a decrease in the engine load.

When the center of the operating angle of the intake valve is retarded, the opening timing of the intake valve is also retarded accordingly. As a result, a piston is located farther away from the exhaust top dead center at the time the intake valve is opened (that is, at the opening timing of the intake valve). Therefore, when the intake valve is opened, the combustion chamber has a lower pressure and the air is introduced into the combustion chamber at a higher flow rate. Such a higher flow rate of the intake air supplements insufficient fuel atomization in the combustion chamber. In other words, the higher flow rate of the intake air alleviates the insufficient fuel atomization.

As mentioned above, when the engine load is relatively low (lower than the predetermined value), insufficient fuel atomization is relatively more likely to occur due to a small intake air amount into the combustion chamber. Therefore, the alleviation of insufficient fuel atomization by the higher flow rate of the intake air significantly contributes to improvement in the combustion state. As a result, the fuel consumption capability is improved. The more the center of the operating angle is retarded and the larger the intake air amount is (that is, the higher the engine load is), the more the insufficient fuel atomization is alleviated and the more the fuel efficiency is improved as a result.

According to the first aspect of the invention, when the engine load is lower than the predetermined value in the low load operation, the center of the operating angle of the intake valve is retarded with a decrease in the engine load. Although fuel efficiency generally tends to decrease with a decrease in the engine load, such a tendency can be alleviated by setting the center of the operating angle as such. As a result, further improvement in fuel consumption capability can be obtained.

A second aspect of the invention relates to a valve characteristic controlling method for an internal combustion engine, which for variably controls an operating angle of an intake valve and a center of the operating angle according to an operating state of the internal combustion engine. In the method, an intake air amount is reduced in a low load operation by reducing the operating angle of the intake valve. The method includes the steps of: advancing the center of the operating angle of the intake valve so that an opening timing of the intake valve is advanced with a decrease in the engine load when an engine load is equal to or higher than a predetermined value in the low load operation; and retarding the center of the operating angle of the intake valve so that the opening timing of the intake valve is retarded with a decrease in the engine load when the engine load is lower than the predetermined value in the low load operation.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 1 schematically shows an engine control system according to an embodiment of the invention;

FIG. 2A shows how a variable valve timing mechanism changes valve characteristics according to the embodiment of the invention;

FIG. 2B shows how a variable operating angle mechanism changes valve characteristics according to the embodiment of the invention;

DETAILED DESCRIPTION OF THE PREFERRED EMBODIMENTS

Figure 3:
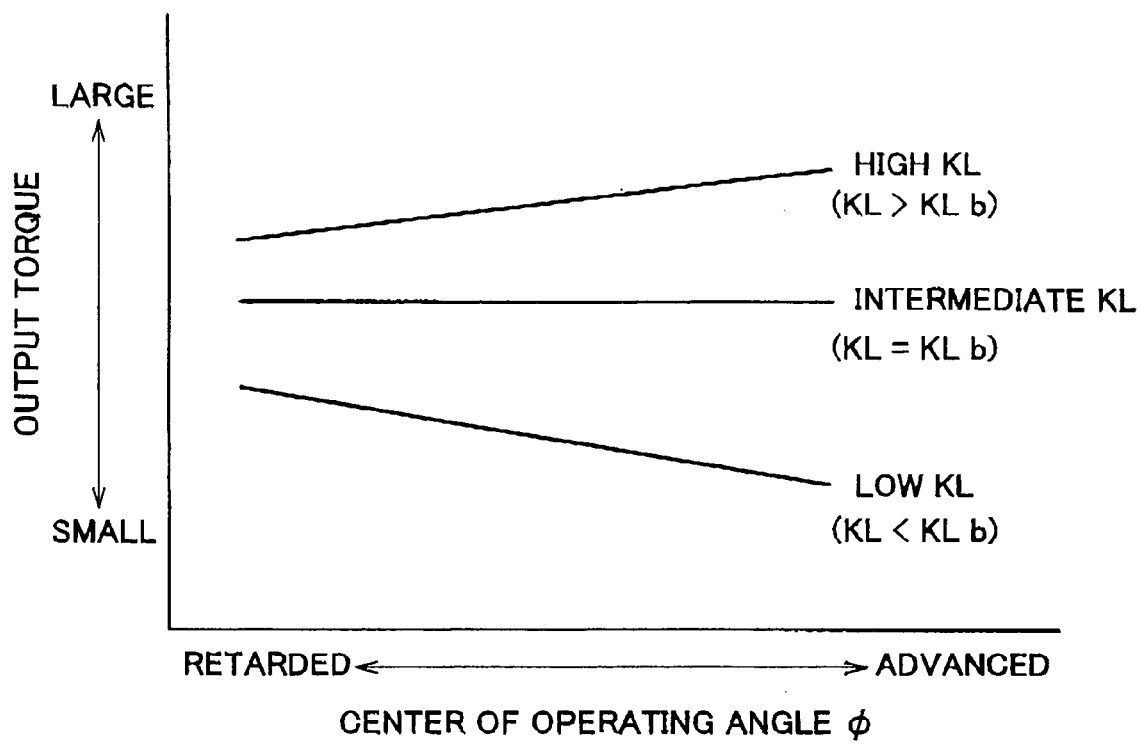
FIG. 3 shows the relation between the center of an operating angle of an intake valve and the output torque according to the embodiment of the invention.

Hereinafter, an embodiment of the invention will be described in detail with reference to FIGS. 1 through 6.

FIG. 1 schematically shows the structure of an on-board internal combustion engine 10 according to this embodiment. As shown in FIG. 1, the internal combustion engine 10 is mainly formed from an intake passage 11, a combustion chamber 12, and an exhaust passage 13.

An air flow meter 14 and a throttle valve 15 are provided in the intake passage 11 of the internal combustion engine 10. The air flow meter 14 detects an air flow rate in the intake passage 11. The throttle valve 15 changes the flow path area in the intake passage 11 to change the air flow rate. The intake passage 11 is connected to the combustion chamber 12 through an intake valve 16. The combustion chamber 12 is connected to the exhaust passage 13 through an exhaust valve 17. The intake valve 16 and the exhaust valve 17 are driven according to revolution of the internal combustion engine 10. More specifically, the intake valve 16 and the exhaust valve 17 open and close the intake passage 11 and the exhaust passage 13 which are connected to the combustion chamber 12 according to revolution of the internal combustion engine 10.

The air is introduced into the combustion chamber 12 through the intake passage 11. A spark plug 18 ignites a fuel-air mixture in the combustion chamber 12, a mixture of the air introduced into the combustion chamber 12 through the intake passage 11 and fuel injected from a fuel injection valve (not shown) into the combustion chamber 12. When the spark plug 18 ignites the fuel-air mixture, a piston 19 reciprocates as a result of the combustion of the fuel-air mixture, and a crankshaft, an engine output shaft, is rotated accordingly. The burnt fuel-air mixture goes out of the combustion chamber 12 into the exhaust passage 13 as exhaust gas. An exhaust purifying catalyst 20, a three way catalyst, is provided in the exhaust passage 13 in order to purify exhaust gas from the combustion chamber 12.

A valve operating system for the intake valve 16 of the internal combustion engine 10 includes a variable valve timing mechanism (variable VT mechanism) 21 and a variable operating angle mechanism 22. As shown in FIG. 2A, the variable VT mechanism 21 continuously changes the center $\phi$ of an operating angle of the intake valve 16 (that is, the center of a working angle of a cam for driving the intake valve 16). The variable VT mechanism 21 that is used in this internal combustion engine 10 changes the center $\phi$ of the operating angle by changing the relative rotational phase of a camshaft with respect to a crankshaft.

As shown in FIG. 2B, the variable operating angle mechanism 22 continuously changes the operating angle $\theta$ of the intake valve 16. Note that, as shown in FIG. 2B, this variable operating angle mechanism 22 increases/decreases the maximum lift amount of the intake valve 16 according to an increase/decrease in the operating angle $\theta$. Moreover, the variable operating angle mechanism 22 advances/retards the opening time of the intake valve 16 (the timing the intake valve 16 switches from the closed state to the open state) according to an increase/decrease in the operating angle θ.

An electronic controller 30 controls various operations of the internal combustion engine 10 such as fuel injection and ignition timing. The electronic controller 30 includes a central processing unit (CPU), a read only memory (ROM), a random access memory (RAM), input/output (I/O) ports, and the like. The CPU performs various calculations for controlling the internal combustion engine 10. Control programs and control data are pre-stored in the ROM. Calculation results from the CPU and data from sensors and the like are stored in the RAM. The I/O ports transmit and receive signals to and from the outside.

The air flow meter 14, a throttle sensor, a valve timing (VT) sensor, and an operating angle sensor are connected to the input ports of the electronic controller 30. The throttle sensor is provided for the throttle valve 15 and detects an opening amount T of the throttle valve 15 (a throttle opening T). The VT sensor is provided in the variable VT mechanism 21 and detects a current center $\phi$ of the operating angle of the intake valve 16. The operating angle sensor is provided in the variable operating angle mechanism 22 and detects a current operating angle θ of the intake valve 16.

An accelerator position sensor 31, a crank angle sensor 32, and a water temperature sensor 33 are also connected to the input ports of the electronic controller 30. The accelerator position sensor 31 detects the stepping amount of an accelerator pedal. The crank angle sensor 32 detects the number of revolutions of the crankshaft. In other words, the crank angle sensor 32 detects the engine speed Ne. The water temperature sensor 33 detects the temperature of cooling water of the internal combustion engine 10 (the engine cooling water temperature). Various other sensors for detecting the operating state of the internal combustion engine 10 and the running state of the vehicle are also connected to the input ports of the electronic controller 30.

Various actuators for controlling the internal combustion engine 10 are connected to the output ports of the electronic controller 30. For example, actuators for the throttle valve 15, the ignition plug 18, the variable VT mechanism 21, and the variable operating angle mechanism 22 are connected to the output ports of the electronic controller 30. The electronic controller 30 drives these actuators according to the detection results of the above sensors. The electronic controller 30 thus controls various operations of the internal combustion engine 10.

For example, the electronic controller 30 variably controls valve characteristics of the intake valve 16 (such as the center $\phi$ of the operating angle and the operating angle θ) in the following manner: the electronic controller 30 first calculates respective target values of the center $\phi$ of the operating angle and the operating angle θ of the intake valve 16 according to the current engine operating state. The electronic controller 30 calculates these target values based on sensor outputs such as the stepping amount of the accelerator pedal from the accelerator position sensor 31 and the engine speed Ne from the crank angle sensor 32. The electronic controller 30 then feedback-controls the variable VT mechanism 21 and the variable operating angle mechanism 22 so that the current center $\phi$ of the operating angle and the current operating angle θ of the intake valve 16 which are detected by the VT sensor and the operating angle sensor reach the respective target values. Valve characteristics of the intake valve 16 are thus optimized according to the current operating state of the engine.

In the above internal combustion engine 10, the amount of air that is introduced into the combustion chamber 12 (the intake air amount Ga) varies with a change in the operating angle θ of the intake valve 16 by the variable operating angle mechanism 22. Therefore, the electronic controller 30 controls the opening amount of the throttle valve 15 according to the operating angle θ (cooperative control of the operating angle θ and the throttle opening Ta). In other words, when the operating angle θ of the intake valve 16 is changed by the variable operating angle mechanism 22, the opening amount of the throttle valve 15 is changed accordingly. As a result, a required intake air amount Ga is assured.

In this embodiment, the intake air amount Ga is reduced in the low load operation by reducing the operating angle θ of the intake valve 16. The idle state is a relatively lower load state in the low load operation. In the idle state, an extremely small intake air amount Ga is realized by reducing the operating angle θ at the minimum throttle opening Ta. In this way, an extremely low load operation is implemented in the idle state.

Hereinafter, characteristic structures of this embodiment will be described.

For example, when the center $\phi$ of the operating angle of the intake valve 16 is retarded, the opening timing of the intake valve 16 is retarded accordingly. As a result, an intake resistance (a resistance of the intake air from an intake manifold to the combustion chamber 12) increases, causing an increase in pumping loss.

In this case, due to the retarded opening timing of the intake valve 16, the piston 19 is located farther from the exhaust top dead center at the time the intake valve 16 is opened (that is, at the opening timing of the intake valve 16). Therefore, when the intake valve 16 is opened, the combustion chamber 12 has a lower pressure and the air is introduced into the combustion chamber 12 at a higher flow rate. Due to the reduced operating angle θ, only a small amount of air is introduced into the combustion chamber 12 and insufficient fuel atomization is more likely to occur in the combustion chamber 12. However, since the air is introduced into the combustion chamber 12 at a higher flow rate, such insufficient fuel atomization is alleviated.

Retarding the center $\phi$ of the operating angle of the intake valve 16 thus simultaneously causes opposite phenomena in the internal combustion engine 10, that is, an increase in pumping loss and alleviation of insufficient fuel atomization. An increase in pumping loss reduces fuel efficiency (specific fuel consumption), while alleviation of insufficient fuel atomization suppresses reduction in fuel efficiency.

For example, when the engine load is relatively high (e.g. when the engine load is higher than an engine load during an idle state), a large amount of air is introduced into the combustion chamber 12. In other words, the intake air amount Ga is large. Therefore, insufficient fuel atomization is relatively less likely to occur. Even if the center $\phi$ of the operating angle of the intake valve 16 is retarded, alleviation of insufficient fuel atomization resulting from the retardation will contribute to improvement in the combustion state to a smaller degree.

The more the opening timing of the intake valve 16 is retarded, the farther the piston 19 is located from the exhaust top dead center and the lower the pressure in the combustion chamber 12 becomes at the time the intake valve 16 is opened. Therefore, the more the opening timing of the intake valve 16 is retarded, the more the pumping loss increases. The pumping loss is thus likely to vary with a change in the opening timing of the intake valve 16 but is less likely to vary with a change in the intake air amount Ga.

Therefore, when the center ϕ of the operating angle of the intake valve 16 is retarded in a relatively high engine load state, the pumping loss increases, whereas the effect of alleviation of insufficient fuel atomization is less likely to be obtained. As a result, the fuel efficiency is likely to decrease.

When the engine load is relatively low (e.g. when the engine load is lower an engine load during an idle state), however, insufficient fuel atomization is likely to occur due to a small intake air amount Ga. Accordingly, alleviation of insufficient fuel atomization resulting from retarding the center ϕ of the operating angle of the intake valve 16 will contribute to improvement in the combustion state to a larger degree.

The influence of retarding the opening timing of the intake valve 16 on fuel efficiency varies according to the engine load level. FIG. 3 shows the result of the experiment that was conducted to confirm this. Note that the engine load level is herein indicated by an engine load factor KL (the ratio of load to the full load (WOT (Wide Open Throttle))). However, the invention is not limited to this. For example, the engine load level may alternatively be indicated by an intake air amount Ga, an intake negative pressure (depression in the intake manifold) Pm, and the like.

The intake negative pressure Pm can be estimated based on the detection results of the air flow meter 14, the throttle sensor, the crank angle sensor 32, the operating angle sensor, and the like. In other words, the intake negative pressure Pm can be estimated based on the air flow rate in the intake passage 11, the throttle opening Ta, the engine speed Ne, the operating angle θ, and the like.

FIG. 3 shows the result of the experiment that was conducted in a low load operation, and more specifically, in a load operation which is lower than a load operation during the idle state (a lower load state in the low load operation). This experiment was conducted at a fixed engine speed Ne and a fixed operating angle θ of the intake valve 16.

As shown in FIG. 3, at a high engine load factor KL, the output torque of the internal combustion engine 10 increases with an advance of the center ϕ of the operating angle of the intake valve 16. In other words, the characteristic line increases to the right. This indicates that, at the high engine load factor KL, advancing the center ϕ of the operating angle of the intake valve 16 is more suitable for improvement in fuel efficiency than retarding it.

On the other hand, at a low engine load factor KL, the output torque of the internal combustion engine 10 decreases with an advance of the center ϕ of the operating angle of the intake valve 16. In other words, the characteristic line decreases to the right. This indicates that, at the low engine load factor KL, retarding the center ϕ of the operating angle of the intake valve 16 is more suitable for improvement in fuel efficiency than advancing it.

This experimental result demonstrates the aforementioned effect of retarding the center ϕ of the operating angle of the intake valve 16. More specifically, this experimental result demonstrates that retarding the center ϕ of the operating angle of the intake valve 16 in a relatively high load operation reduces fuel efficiency and that retarding the center ϕ of the operating angle of the intake valve 16 in a relatively low load operation improves fuel efficiency. It is considered from this experimental result that this effect is remarkable in a low load operation such as a load operation which is lower than the load operation during the idle state. The reason for this is as follows: since the intake air amount Ga is extremely small in the low load operation, even a slight change of the engine load will greatly affect fuel atomization.

In this experimental result, the characteristic line has different profiles depending on the engine load factor KL. The characteristic line increases to the right at a relatively high engine load factor KL and decreases to the right at a relatively low engine load factor KL. It is therefore considered that the characteristic line has a substantially horizontal profile at an engine load factor KL between the relatively high engine load factor KL and the relatively low engine load factor KL (see the characteristic line of "intermediate KL" in FIG. 3). At this engine load factor KL, the output torque hardly changes with a change of the center ϕ of the operating angle.

Figure 6:
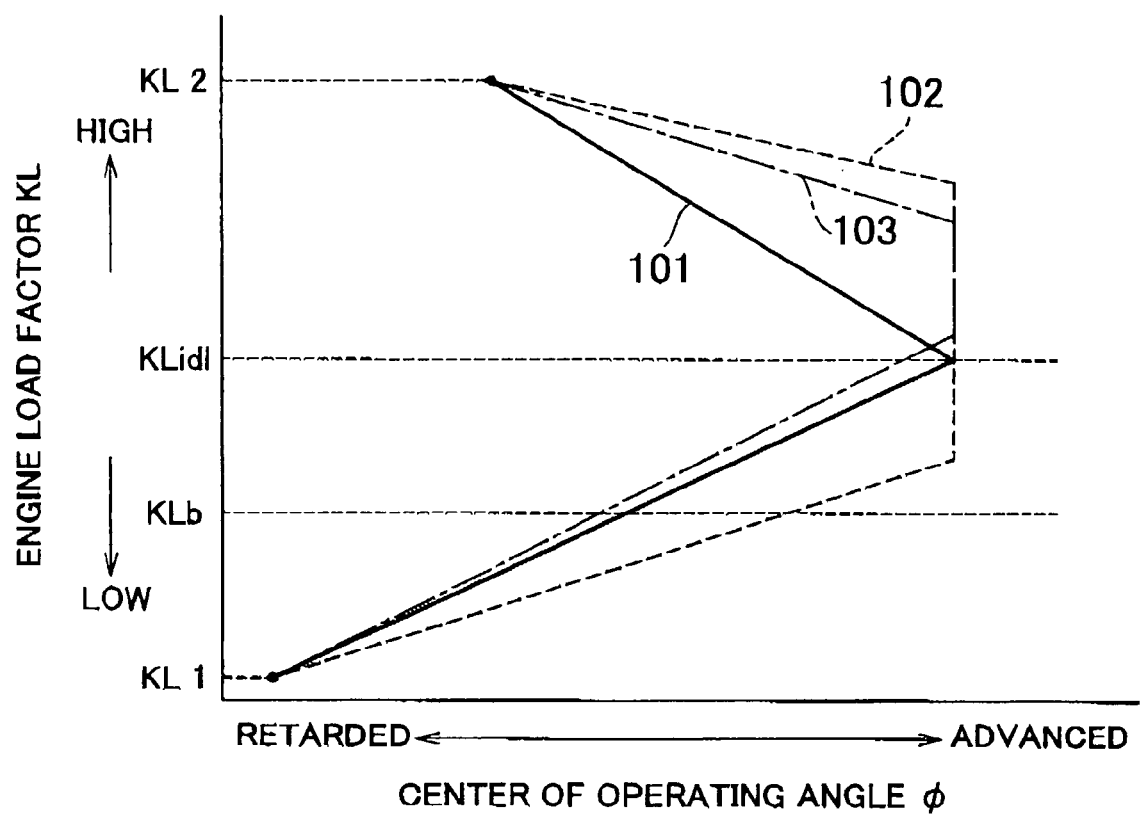
FIG. 6 shows examples of setting the center of the operating angle of the intake valve according to the engine load factor according to the embodiment of the invention.

At this engine load factor KL, the influence of the alleviation of insufficient fuel atomization on fuel efficiency cancels out the influence of the increase in pumping loss on fuel efficiency. Therefore, at this engine load factor KL, fuel efficiency neither improves nor reduces even when the center ϕ of the operating angle is changed. Accordingly, for further improvement in fuel consumption capability, it is effective to set the center ϕ of the operating angle based on the engine load factor KLidl during the idle state (ref. FIG. 6). More specifically, it is effective to set the center ϕ of the operating angle differently between an engine load factor KL higher than the threshold KLidl and an engine load factor KL lower than the threshold KLidl.

When the engine load factor KL is higher than the threshold KLb, reduction in fuel efficiency is suppressed by advancing the center ϕ of the operating angle of the intake valve 16. The more the center ϕ of the operating angle is advanced and the more the intake air amount Ga is (that is, the higher the engine load is), the more the fuel efficiency is improved.

On the other hand, when the engine load factor KL is lower than the threshold KLb, reduction in fuel efficiency is suppressed by retarding the center ϕ of the operating angle. The more the center ϕ of the operating angle is retarded and the more the intake air amount Ga is (that is, the higher the engine load is), the more the fuel efficiency is improved.

In this embodiment, the center ϕ of the operating angle is variably controlled as follows: when the engine load factor KL of the low load operation is equal to or higher than the thresholdKLidl, the center ϕ of the operating angle is advanced with a decrease in the engine load factor KL. On the other hand, when the engine load factor KL of the low load operation is lower than the thresholdKLidl, the center ϕ of the operating angle is retarded with a decrease in the engine load factor KL.

Fuel efficiency generally tends to reduce with a decrease in the engine load factor KL. However, by controlling the center ϕ of the operating angle as such, this tendency is alleviated regardless of whether the engine load factor KL is equal to or higher the threshold KLidl or lower than the threshold KLidl.

Figure 4A:
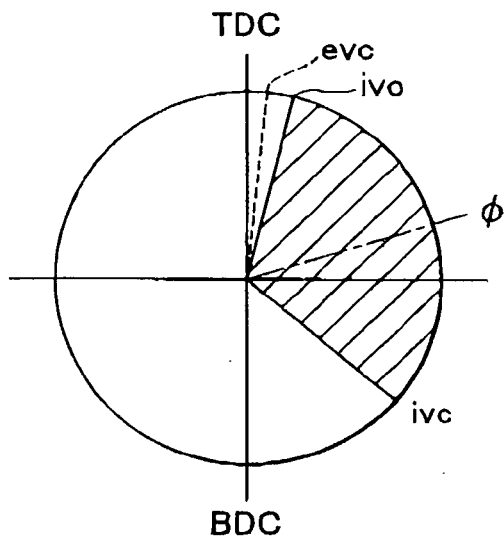
FIGS. 4A and 4B show examples of the center of the operating angle of the intake valve according to the embodiment of the invention.
Figure 4B:
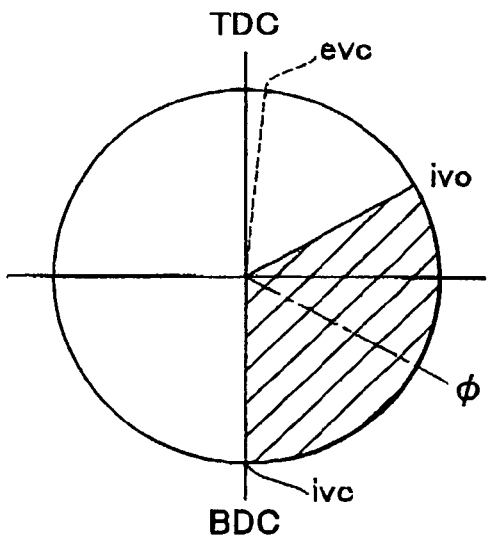
Figure 5:
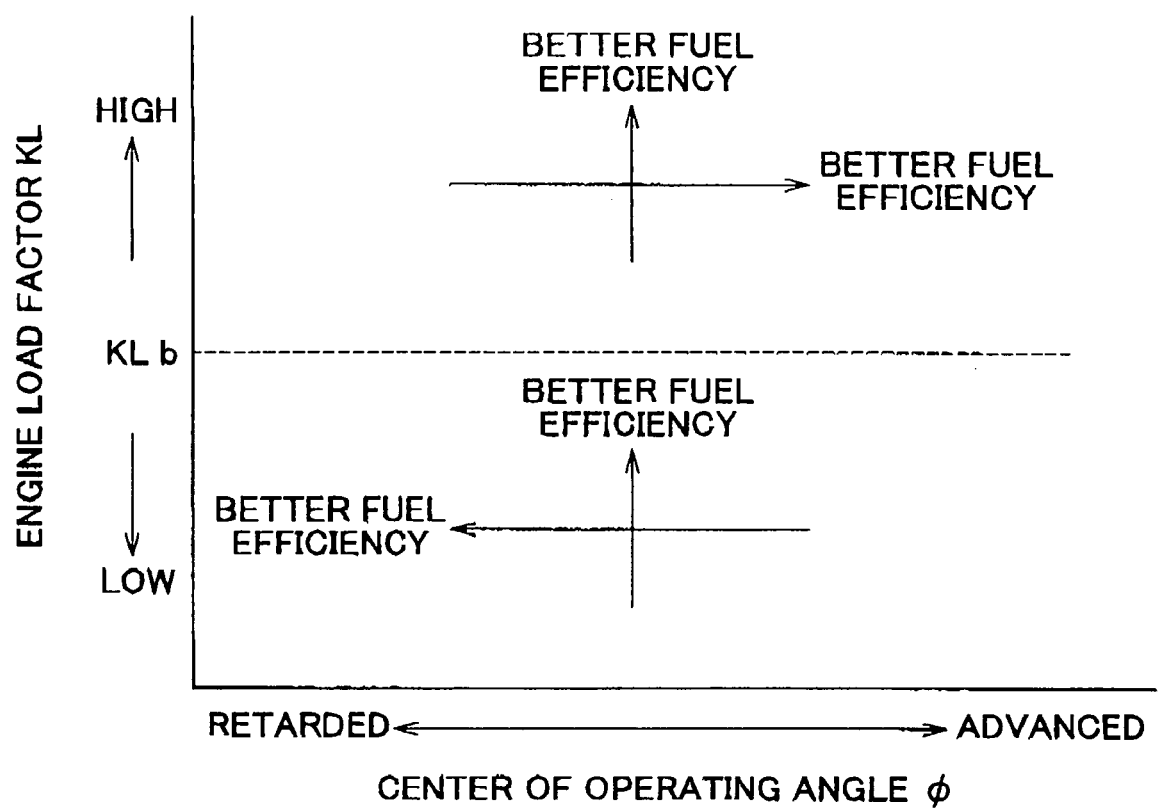
FIG. 5 shows the relation among the center of the operating angle of the intake valve, an engine load factor, and fuel efficiency according to the embodiment of the invention.

FIGS. 4A and 4B show examples of such variable control of the center ϕ of the operating angle at a fixed operating angle θ. In the example of FIG. 4A, the center ϕ of the operating angle is advanced to the maximum. In the example of FIG. 4B, the center ϕ of the operating angle is retarded to the maximum.

In this embodiment, the center ϕ of the operating angle is variably controlled within the range from FIG. 4A to FIG. 4B according to the engine load factor KL. As shown in FIGS. 4A and 4B, the operating angle θ of the intake valve 16 is smaller than 180° CA (crank angle), and the center ϕ of the operating angle is variably controlled so that the open period of the intake valve 16 (the period during which the intake valve 16 is in the open state) does not overlap the exhaust stroke nor the compression stroke, that is, so that the open period of the intake valve 16 is included in the intake stroke.

In FIGS. 4A and 4B, TDC indicates the exhaust top dead center (the timing the piston 19 is located at the exhaust top dead center), and BDC indicates the bottom dead center (the timing the piston 19 is located at the bottom dead center). Moreover, ivo indicates the opening timing of the intake valve 16 (the timing the intake valve 16 switches from the closed state to the open state), and ivo indicates the closing timing of the intake valve 16 (the timing the intake valve 16 switches from the open state to the closed state). Therefore, the hatched portion in FIGS. 4A and 4B indicates the period during which the intake valve 16 is in the open state. Note that evc indicates the closing timing of the exhaust valve 17 (the timing the exhaust valve 17 switches from the open state to the closed state).

In these examples, the closing timing evc of the exhaust valve 17 is retarded with respect to the exhaust top dead center TDC. However, the invention is not limited to this. For example, the closing timing evc of the exhaust valve 17 may be set to the exhaust top dead center TDC.

As described above, at an engine load factor KL higher than the threshold KLb, fuel efficiency is improved as the center $\phi$ of the operating angle is advanced and as the engine load factor KL is higher. On the other hand, at an engine load factor KL lower than the threshold KLb, fuel efficiency is improved as the center $\phi$ of the operating angle is retarded and as the engine load factor KL is higher (see FIG. 5). Therefore, in this embodiment, the center $\phi$ of the operating angle is set according to the engine load factor KL, for example, in the manner shown in FIG. 6.

FIG. 6 shows how the center $\phi$ of the operating angle is set in the range from a first value KL1 to a second value KL2 of the engine load factor KL. The first value KL1 is lower than the threshold KLidl, and the second value KL2 is higher than the threshold KLidl.

In the example 101 (a solid line in FIG. 6), at an engine load factor KL equal to or higher than the threshold KLidl, the center $\phi$ of the operating angle is advanced with a decrease in the engine load factor KL. On the other hand, at an engine load factor KL lower than the threshold KLidl, the center $\phi$ of the operating angle is retarded with a decrease in the engine load factor KL.

Setting of the center $\phi$ of the operating angle is not limited to the example 101. For example, the center $\phi$ of the operating angle may be set as shown in the example 102 (a broken line in FIG. 6). More specifically, regarding an engine load factor KL equal to or higher than the threshold KLidl, there may be a range where the center $\phi$ of the operating angle is not changed with a change of the engine load factor KL as long as there is a range where the center $\phi$ of the operating angle is advanced with a decrease in the engine load factor KL. Similarly, regarding an engine load factor KL lower than the threshold KLidl, there may be a range where the center $\phi$ of the operating angle is not changed with a change of the engine load factor KL as long as there is a range where the center $\phi$ of the operating angle is retarded with a decrease in the engine load factor KL.

The center $\phi$ of the operating angle may alternatively be set as shown in the example 103 (a chain-dotted line in FIG. 6). More specifically, regarding an engine load factor KL equal to or higher than the threshold KLidl, there may be a range where the center $\phi$ of the operating angle is retarded with a decrease in the engine load factor KL as long as there is a range where the center $\phi$ of the operating angle is advanced with a decrease in the engine load factor KL. In this case, as long as there is a range where the center $\phi$ of the operating angle is advanced with a decrease in the engine load factor KL, the effect of suppressing reduction in fuel efficiency is obtained in this range. Similarly, although not shown in the figure, regarding an engine load factor KL lower than the threshold KLb, there may be a range where the center $\phi$ of the operating angle is advanced with a decrease in the engine load factor KL as long as there is a range where the center $\phi$ of the operating angle is retarded with a decrease in the engine load factor KL.

In this embodiment, the following effects can be obtained:

(1) When the engine load factor KL is relatively high (equal to or higher than the threshold KLidl) in the low load operation, the center $\phi$ of the operating angle of the intake valve 16 is advanced with a decrease in the engine load factor KL. At such a high engine load factor KL, insufficient fuel atomization is relatively less likely to occur due to a large intake air amount Ga. Therefore, advancing the center $\phi$ of the operating angle suppresses increase in pumping loss and thus suppresses reduction in fuel efficiency. The more the center $\phi$ of the operating angle is advanced and the larger the intake air amount Ga is (that is, the higher the engine load factor KL is), the more the increase in pumping loss is suppressed and the more the fuel efficiency is improved as a result.

According to this embodiment, when the engine load factor KL is equal to or higher than the threshold KLidl in the low load operation, the center $\phi$ of the operating angle of the intake valve 16 is advanced with a decrease in the engine load factor KL. Although fuel efficiency generally tends to reduce with a decrease in the engine load factor KL, such a tendency can be alleviated by setting the center $\phi$ of the operating angle as such. As a result, further improvement in fuel consumption capability can be obtained.

On the other hand, when the engine load factor KL is relatively low (lower than the threshold KLidl) in the low load operation, the center $\phi$ of the operating angle of the intake valve 16 is retarded with a decrease in the engine load factor KL. At such a low engine load factor KL, insufficient fuel atomization is relatively more likely to occur due to a small intake air amount Ga. Therefore, by retarding the center $\phi$ of the operating angle, the air is introduced into the combustion chamber 12 at a higher flow rate, whereby insufficient fuel atomization is alleviated. This alleviation of insufficient fuel atomization significantly contributes to improvement in the combustion state. As a result, the fuel consumption capability is improved.

The more the center $\phi$ of the operating angle is retarded and the larger the intake air amount Ga is (that is, the higher the engine load factor KL is), the more the insufficient fuel atomization is alleviated and the more the fuel efficiency is improved as a result.

According to this embodiment, when the engine load factor KL is lower than the threshold KLidl in the low load operation, the center $\phi$ of the operating angle of the intake valve 16 is retarded with a decrease in the engine load factor KL. Although fuel efficiency generally tends to reduce with a decrease in the engine load factor KL, such a tendency can be alleviated by setting the center $\phi$ of the operating angle as such. As a result, further improvement in fuel consumption capability can be obtained.

Note that the invention is not limited to the above embodiment and may be embodied as follows:

In the examples of FIGS. 4A and 4B, the opening timing ivo of the intake valve 16 is retarded with respect to the closing timing evc of the exhaust valve 17. However, the invention is not limited to this. The opening timing ivo of the intake valve 16 may be the same as, or advanced with respect to, the closing timing evc of the exhaust valve 17. In the example of FIG. 4B, the closing timing ivo of the intake valve 16 is set to the bottom dead center BDC. However, the invention is not limited to this. The closing timing ivo of the intake valve 16 may be different from the bottom dead center BDC.

When the engine load is lower than a predetermined value (for example, when the engine load factor KL is lower than the threshold KLidl), the center φ of the operating angle of the intake valve 16 may be retarded with an increase in the intake negative pressure Pm (that is, as the intake negative pressure Pm increases in the negative direction with respect to the atmospheric pressure).

The difference between the intake negative pressure Pm and the pressure in the combustion chamber 12 (the combustion chamber pressure) decreases with an increase in the intake negative pressure Pm. In other words, as the intake negative pressure Pm becomes higher, the air is introduced into the combustion chamber 12 at a lower flow rate upon opening of the intake valve 16, and the intake air amount Ga decreases. Therefore, insufficient fuel atomization is more likely to occur.

According to the invention, however, when the engine load is lower than the predetermined value and the engine load is lower than the predetermined value, the center φ of the operating angle is retarded with an increase in the intake negative pressure Pm. Therefore, the piston 19 can be located farther away from the exhaust top dead center at the time the intake valve 16 is opened. In this case, the air is introduced into the combustion chamber 12 at a higher flow rate upon opening of the intake valve 16, which is advantageous for alleviation of the insufficient fuel atomization.

Insufficient fuel atomization is generally more likely to occur with an increase in the intake negative pressure Pm. According to the invention, however, reduction in fuel efficiency resulting from such insufficient fuel atomization can be suppressed.

In the above embodiment, the throttle opening Ta is variably controlled in addition to the operating angle θ of the intake valve 16. However, the invention is not limited to this. For example, the invention may be applied in an embodiment in which the intake air amount Ga is adjusted by variably controlling only the operating angle θ of the intake valve 16.

What is claimed is:

1. A valve characteristic controlling apparatus for an internal combustion engine, comprising:

a valve characteristic device that variably controls an operating angle of an intake valve and a center of the operating angle according to an operating state of the internal combustion engine; and a controller that controls the valve characteristic device so as to reduce the operating angle of the intake valve to reduce an intake air amount in a low load operation of the internal combustion engine, to advance the center of the operating angle of the intake valve with a decrease in the engine load when an engine load is equal to or higher than a predetermined value in the low load operation, and to retard the center of the operating angle of the intake valve with a decrease in the engine load when the engine load is lower than the predetermined value in the low load operation.

2. The valve characteristic controlling apparatus according to claim 1, wherein the controller adjusts the intake air amount by controlling an opening amount of a throttle valve in addition to controlling the operating angle of the intake valve, and the controller retards the center of the operating angle of the intake valve with an increase in an intake negative pressure when the engine load is lower than the predetermined value.

3. The valve characteristic controlling apparatus according to claim 1, wherein a situation where the engine load is equal to the predetermined value is a situation where the internal combustion engine is in an idle state.

4. A valve characteristic controlling method for an internal combustion engine, which for variably controls an operating angle of an intake valve and a center of the operating angle according to an operating state of the internal combustion engine, wherein an intake air amount is reduced in a low load operation of the internal combustion engine by reducing the operating angle of the intake valve, comprising:

advancing the center of the operating angle of the intake valve so that an opening timing of the intake valve is advanced with a decrease in the engine load when an engine load is equal to or higher than a predetermined value in the low load operation; and retarding the center of the operating angle of the intake valve so that the opening timing of the intake valve is retarded with a decrease in the engine load when the engine load is lower than the predetermined value in the low load operation.

* * * * *